United States Patent [19]

Arioka et al.

[11] Patent Number: 5,391,462
[45] Date of Patent: Feb. 21, 1995

[54] OTICAL RECORD DISK

[75] Inventors: Hiroyuki Arioka; Koji Yasukawa; Junji Tominaga; Atsuko Motai, all of Nagana, Japan

[73] Assignee: TDK Corporation, Tokyo, Japan

[21] Appl. No.: 91,434

[22] Filed: Jul. 15, 1993

[30] Foreign Application Priority Data

Aug. 28, 1992 [JP] Japan .................. 4-253834

[51] Int. Cl.$^6$ .................................. B32B 3/00
[52] U.S. Cl. ...................... 430/271; 430/270; 430/495; 430/945; 346/135.1; 369/283; 369/288
[58] Field of Search .......... 430/271, 945, 495, 270; 346/135.1; 369/288, 283

[56] References Cited

U.S. PATENT DOCUMENTS

| | | | |
|---|---|---|---|
| 4,814,256 | 3/1989 | Aldag et al. | 430/270 |
| 4,914,001 | 3/1990 | Inagaki et al. | 430/270 |
| 5,270,150 | 12/1993 | Oishi | 430/271 |
| 5,294,471 | 3/1994 | Evans et al. | 430/270 |

FOREIGN PATENT DOCUMENTS

| | | |
|---|---|---|
| 56-56720 | 10/1982 | Japan . |
| 58-176582 | 4/1985 | Japan . |
| 58-176583 | 4/1985 | Japan . |

Primary Examiner—Thorl Chea
Attorney, Agent, or Firm—Watson, Cole Grindle & Watson

[57] ABSTRACT

In an optical recording disk comprising a substrate, a dye base recording layer, and a reflective layer, the recording layer contains a metal complex having a center metal, and the reflective layer is formed of an alloy of at least two metal elements wherein the total content of a metal element(s) having ionization tendency equal to or greater than the center metal is limited to 0 to 10% by weight. This minimizes reaction between metals in the recording and reflective layers, maintaining the disk reliable.

2 Claims, 1 Drawing Sheet

OTICAL RECORD DISK

BACKGROUND OF THE INVENTION

1. Field of the Invention

This invention relates to an optical recording disk having a dye base recording layer.

2. Prior Art

Optical recording disks of the write-once, rewritable and other types have been of great interest as high capacity information bearing media. Among the write-once optical recording disks, those having a recording layer predominantly comprising a dye have the advantage of low cost manufacture because the recording layer can be formed by coating.

There were commonly used optical recording disks of the air-sandwich structure having an air space on a dye base recording layer. Recently disks of the close contact type having a reflective layer in close contact with a recording layer were proposed because they could be reproduced in accordance with the compact disk (CD) standard. See Nikkei Electronics, Jan. 23, 1989, No. 465, page 107; the Functional Dye Department of the Kinki Chemical Society, Mar. 3, 1989, Osaka Science & Technology Center; and Proceedings SPIE—The International Society for Optical Engineering, Vol. 1078, pages 80-87, "Optical Data Storage Topical Meeting", 17-19, January 1989, Los Angels. The optical recording disks of the close contact type are fabricated by forming a dye layer, a reflective layer and a protective layer on a transparent substrate in the described order so that the reflective layer is in close contact with the dye layer, meeting the disk total thickness of 1.2 mm required by the CD standard.

In order that optical recording disks having a dye base recording layer be reproduced by means of a CD player, one proposal uses a gold (Au) reflective layer because the aluminum reflective layer used in conventional CDs has insufficient reflectivity. Although gold has high reflectivity and corrosion resistance, it is expensive. It is thus contemplated to use less expensive metals having reflectivity as high as gold, for example, alloys such as Ag—Cu and Cu—Al alloys.

Optical recording disks using organic dyes in the recording layer are known to contain metal complexes as singlet oxygen quenchers in the recording layer. Some dyes are in the form of metal complexes. Disks having reflective layers of copper and other alloys, however, are less reliable because copper and some metals are reactive with metal complexes as the dye, causing deterioration of the dye and a lowering of signal outputs.

SUMMARY OF THE INVENTION

Therefore, an object of the invention is to provide a novel and improved optical recording disk having a dye base recording layer which disk is less expensive and highly reliable.

The present invention is directed to an optical recording disk comprising a substrate, a dye base recording layer on the substrate, and a reflective layer on the recording layer. The recording layer contains at least one metal complex having a center metal. The reflective layer is formed of an alloy of at least two metal elements. Assume that Mc is the center metal where the recording layer contains one metal complex or a metal element having the least ionization tendency among the center metals where the recording layer contains more than one metal complex, and Mr is a metal element equal to or greater than Mc in the ionization tendency. The reflective layer contains 0 to 10% by weight of Mr in total.

The ionization tendency is the ionization series of metals tending to release electrons to become ions and quantitatively expressed in terms of standard electrode potential. For typical metals, the ionization series is K > Ca > Na > Mg > Al > Zn > Fe > Co > Ni > Pb > greater (H) > Cu > Ag > Pt > Au. less Then, a metal element having the least ionization tendency is a metal having the most positive standard electrode potential among the center metals where the recording layer contains more than one metal complex. A metal element having greater ionization tendency than another is a metal element having a more negative standard electrode potential than another (that is, the greater ionization tendency metal element is on the left from the other in the aforementioned series).

ADVANTAGES

The present invention provides an optical recording disk having a dye base recording layer and a reflective layer on a substrate in a close contact arrangement and capable of recording/reproducing operation according to the CD standard. Since the content in the reflective layer of metal Mr having ionization tendency equal to or greater than metal Mc in the recording layer is limited to 10% by weight or less, the invention is effective for minimizing dye deterioration and signal output lowering probably by restricting interaction between the metal in the reflective layer and the metal in the recording layer or for other reasons, thus ensuring high reliability.

The invention is useful where the reflective layer is formed of an alloy. In one embodiment to which the invention is advantageously applicable, the recording layer contains a copper complex, and the reflective layer is formed of a silver-copper alloy by selecting silver as a substitute for gold from the point of view of corrosion resistance and reflectivity and adding copper thereto for providing a color similar to gold. In this embodiment, Mc is copper (Cu) and the reflective layer contains copper (Cu) as Mr. The copper content of the reflective layer is limited to 10% by weight or less.

In another embodiment to which the invention is advantageously applicable, the recording layer contains a nickel complex, and the reflective layer is formed of a copper-aluminum alloy by selecting copper as a substitute for gold from the point of view of color and reflectivity and adding aluminum thereto for improving corrosion resistance. In this embodiment, Mc is nickel (Ni) and the reflective layer contains aluminum (Al) as Mr. The aluminum content of the reflective layer is limited to 10% by weight or less.

BRIEF DESCRIPTION OF THE DRAWING

The only figure.

DESCRIPTION OF THE PREFERRED EMBODIMENTS

Figure 1:
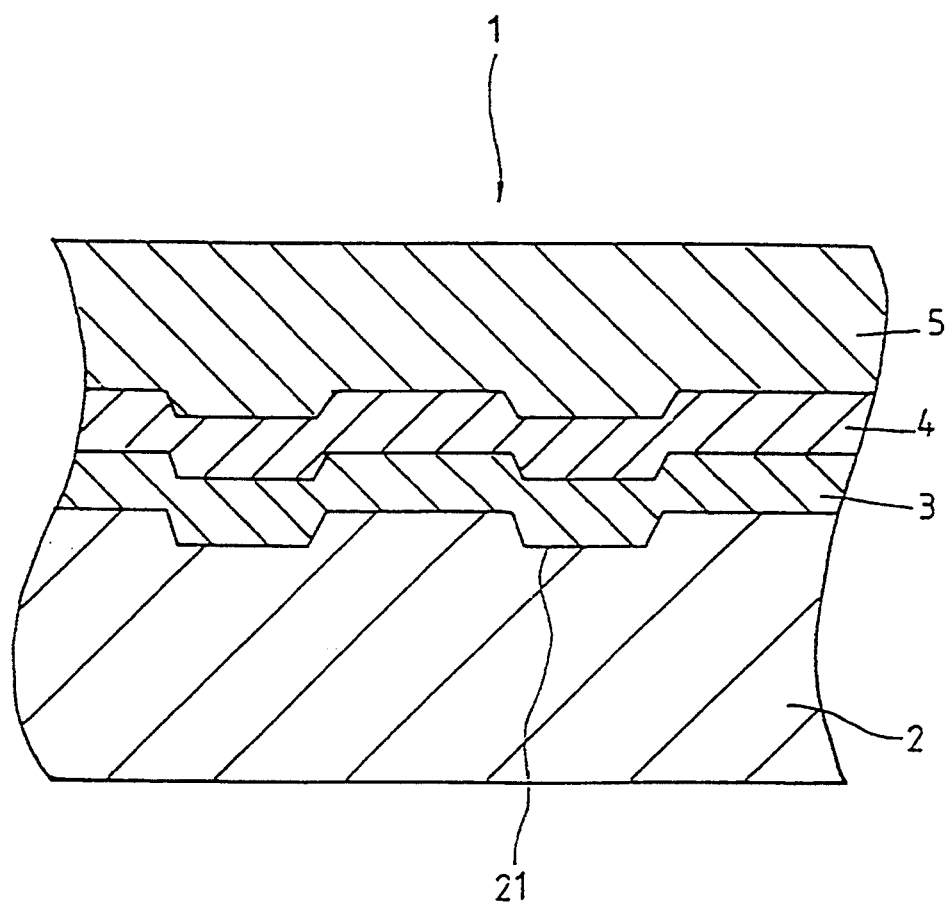
FIG. 1 is a fragmental cross-sectional view of an optical recording disk according to one embodiment of the invention.

The optical recording disk of the invention is an optical recording disk having a dye base recording layer and a reflective layer in close contact therewith and capable of reproduction in accordance with the CD standard.

Referring to FIG. 1, there is schematically illustrated an optical recording disk according to one embodiment of the invention. The optical recording disk 1 shown in FIG. 1 is of the close contact type having a dye base recording layer 3 on one surface of a substrate 2, and further having a reflective layer 4 and an organic protective coating 5 stacked on the recording layer 3 in the described order in close arrangement.

Substrate

The substrate 2 is of conventional disk shape and has commonly used dimensions, for example, a thickness of about 1.2 mm and a diameter of about 80 to 120 mm when the disk is intended for a recordable CD.

The substrate 2 is formed of a resin or glass material which is substantially transparent to recording and reading light, typically a semiconductor laser beam having a wavelength of 600 to 900 nm, especially 770 to 800 nm, most often 780 nm. The substrate material preferably has a transmittance of at least 80%, especially at least 88% so that recording and reading operation can be made through the substrate 2, that is, from the rear surface of the substrate 2 remote from the recording layer 3.

Preferably, the substrate 2 is formed of resins, typically thermoplastic resins such as polycarbonate resin, acrylic resins, amorphous polyolefins, and TPX using conventional techniques such as injection molding. On the surface of the substrate 2 where the recording layer 3 is formed, the upper surface in the illustrated embodiment, a predetermined pattern, typically a groove 21 is formed for tracking and addressing purposes. Alternatively, a resin layer (not shown) having a predetermined pattern including grooves may be formed on the substrate by 2P (photo-polymerization) method or the like.

The tracking groove 21 preferably consists of continuous spiral turns. Typically, the groove has a depth of 500 to 3,000 Å and a width of 0.2 to 1.1 μm, preferably 0.3 to 0.6 μm (width in a radial direction with respect to the disk center). The adjoining groove turns are separated by a land having a width of 0.5 to 1.4 μm, preferably 1.0 to 1.3 μm. This groove configuration permits tracking signals to be obtained without reducing the reflection level of the groove. The groove may be provided with asperities for addressing signals. Where the groove is formed in the substrate surface, a provision is preferably made such that recording light may be directed to a recording layer within the groove.

Recording Layer

The recording layer 3 is formed on the grooved substrate 2 using a dye or a mixture of compatible dyes.

For CD signal recording, the recording layer 3 preferably has a coefficient of extinction (the imaginary part of a complex index of refraction) k of from 0.03 to 0.25 at the wavelength of recording and reading light. With a coefficient of extinction k of less than 0.03, the recording layer can have a lower absorptivity so that it might become difficult to record with a commonly used power. A coefficient of extinction k of more than 0.25 can result in a drop of reflectivity to below 60%, often failing to reproduce according to the CD standard. Better results are obtained with k=0.03 to 0.20, especially 0.03 to 0.15.

The recording layer preferably has an index of refraction (the real part of a complex index of refraction) n of from 1.8 to 4.0, more preferably 2.0 to 3.0 at the wavelength of recording and reading light. With n<1.8, the reflectivity and signal modulation would be reduced, often failing to read by CD players. Few dyes have n>4.0.

The light absorbing dyes used herein preferably have maximum absorption at a wavelength in the range of from 600 to 900 nm, more preferably from 600 to 800 nm, most preferably from 650 to 750 nm. Such a light absorbing dye is preferably selected from cyanine dyes, phthalocyanine dyes, naphthalocyanine dyes, anthraquinone dyes, azo dyes, triphenylmethane dyes, pyrylium dyes, thiapyrylium dyes, squalirium dyes, chroconium dyes, and metal complex dyes alone or in admixture of two or more. Preferred cyanine dyes are cyanine dyes having an indolenine ring which may have a fused aromatic ring, especially a benzoindolenine ring.

The recording layer may also contain a quencher especially when a cyanine dye is used. The quencher is effective for improving light resistance. The quencher may be simply mixed with a light absorbing dye. Alternatively, an ionic combination or ionically bonded compound of a dye cation and a quencher anion is a useful light absorbing dye. The quencher should preferably be added in an amount of up to about 1 mol, especially about 0.05 to 0.5 mol per mol of the light absorbing dye or dyes.

Preferred quenchers used herein are metal complexes of acetylacetonates, bisdithiols such as bis(dithio-α-diketones) and bisphenyldithiols, thiocatechols, salicylaldehydeoximes, and thiobisphenolates. Also useful are amine quenchers such as amine compounds having a nitrogenous radical cation and hindered amines.

For the ionically bonded combination, cyanine dyes having indolenine rings and metal complex quenchers such as bisphenyldithiol metal complexes are preferred.

In the present invention, the recording layer should contain a metal complex which may be either a light absorbing dye or a quencher.

Examples of the recording layer containing a metal complex include a dye film containing a benzenedithiol system nickel complex (JP-A 11090/1982), a recording layer containing an aryl aluminum salt or a metal complex (JP-A 195336/1982), a sheet-shaped recording film containing a bis(diiminosuccinonitrilo) metal complex of Ni, Pd, Pt or Co (JP-A 2833/1983), a recording film containing a metal complex of Co, Ni, Pd or Pt and nitrocellulose (JP-A 16888/1983), a film-shaped recording layer containing a copper complex (JP-A 199194/1983), a recording layer containing manganese phthalocyanine (JP-A 67093/1984), a recording layer containing a transition metal complex and a cyanine dye (JP-A 44390/1985), a recording layer mainly containing a naphthoquinone dye or a metal complex thereof (JP-A 161192/1985 to 161195/1985), a recording layer containing a metal complex of Ni, Pt or Pd used in an optical information recording medium comprising an undercoat layer, the recording layer in the form of an organic dye film, and a protective layer (JP-A 246038/1985), a recording layer containing a dye and a metal complex of Ni, Cu, Co, Pd or Pt (JP-A 231987/1988), and a recording sheet containing a polyvalent metal salt such as a Fe(II) salt (JP-A 144084/1988).

With regard to the dyes, quenchers and their combinations, reference is made to "Chemistry of Functional Dyes", CMC Publishing K.K., pages 74–76 as well as the following patent applications.

| Japanese Patent Application Kokai (JP-A) Nos. | | |
| --- | --- | --- |
| 24692/1984 | 55794/1984 | 55795/1984 |
| 81194/1984 | 83695/1984 | 18387/1985 |
| 19586/1985 | 19587/1985 | 35054/1985 |
| 36190/1985 | 36191/1985 | 44554/1985 |
| 44555/1985 | 44389/1985 | 44390/1985 |
| 47069/1985 | 20991/1985 | 71294/1985 |
| 54892/1985 | 71295/1985 | 71296/1985 |
| 73891/1985 | 73892/1985 | 73893/1985 |
| 83892/1985 | 85449/1985 | 92893/1985 |
| 159087/1985 | 162691/1985 | 203488/1985 |
| 201988/1985 | 234886/1985 | 234892/1985 |
| 16894/1986 | 11292/1986 | 11294/1986 |
| 16891/1986 | 08384/1986 | 14988/1986 |
| 163243/1986 | 210539/1986 | 30083/1987 |
| 32132/1987 | 31792/1987 | |
| Japanese Patent Application No. 54013/1985 | | |

The dye used in the recording layer may be selected from the above-mentioned light absorbing dyes, dye-quencher mixtures, and bonded dye-quencher compounds as long as it has n and k in the above-defined ranges. If desired, a dye of a new design molecular structure may be synthesized.

The coefficient of extinction k of a dye with respect to recording and reading light generally varies over the range of from 0 to about 2 depending on its skeleton and substituent. In selecting a dye having a coefficient of extinction k of 0.03 to 0.25, for example, some limitations are imposed on its skeleton and substituent. Then the coating solvent is limited as the case may be. Some dyes cannot be applied to certain substrates or some cannot be deposited from a gas phase. Further, determining a new molecular design requires an increased amount of labor for design and synthesis.

Through experiments, the inventors found that a dye layer formed of a mixture of at least two dyes has a coefficient of extinction k which is determined from the coefficients of extinction k of the layers consisting of the respective dyes alone, in substantial proportion to the ratio of the dyes. Thus it is possible to form the recording layer from a compatible mixture of two or more dyes.

Most mixtures of dyes have a coefficient of extinction k substantially proportional to the mixing ratio of dyes. More particularly, a mixture of i types of dye has a coefficient of extinction k substantially equal to $\Sigma C_i k_i$ wherein the i-th dye has a coefficient of extinction $k_i$ and a mixing fraction $C_i$. Thus a dye layer having k=0.03 to 0.25 may be formed by mixing dyes having different k in a controlled mixing ratio. This, in turn, means that the dyes used herein can be selected from a wider variety.

The same principle as above can be applied to an improvement in wavelength dependency. In general, a semiconductor laser produces a beam having a wavelength width of ±10 nm. Commercial CD players require a reflectivity of at least 70% in the wavelength range between 770 nm and 790 nm. Generally, the coefficient of extinction k of a dye is largely dependent on a wavelength. Some dyes can have an adequate coefficient k at 780 nm, but a largely deviated coefficient k at 770 or 790 nm. In this case, two distinct dyes may be mixed to form a mixture which has adequate values of k and n over the wavelength range of 780±10 nm.

This eliminates the limitation of film formation such as limitation of a coating solvent and allows for the use of a readily synthesizable, inexpensive dye, a dye having excellent properties, or a sparingly soluble dye.

Where the recording layer is formed of a mixture of dyes, the dyes may be selected from those having an index of refraction n=1.6 to 6.5 and a coefficient of extinction k=0 to 2.

In determining n and k, a sample is prepared by forming a recording layer on a given transparent substrate to a thickness of about 400 to 1,000 Å. Then the reflectivity of the sample is measured through the substrate or from the recording layer side. Reflectivity is measured in a specular reflection mode (of the order of 5°) using light having the recording/reproducing wavelength. The transmittance of the sample is also measured. The index of refraction n and coefficient of extinction k may be calculated from these measurements according to Ishiguro Kozo, "Optics," Kyoritsu Publishing K.K., pages 168–178.

In the practice of the invention, the recording layer is often formed by spin coating, more particularly by dissolving the dye in a suitable organic solvent and applying and spreading the coating solution on a substrate while rotating the substrate. The coating is dried after spin coating, if desired. The organic solvents used herein include alcohols, ketones, esters, ethers, aromatics, and alkyl halides, with organic solvents having two or more functional groups in a molecule being preferred.

Preferably, the recording layer thus formed has a thickness of about 1,000 to about 3,000 Å although the exact thickness depends on the reflectivity or the like.

In addition to the recording layer of the coating type mentioned above, a sheet or film-shaped recording layer may also be used. In this regard, a dye film once shaped to sheet or film shape may be bonded to the substrate or used by itself as a substrate having a recording layer incorporated therein.

Reflective Layer

The reflective layer 4 is applied to the recording layer 3 in direct contact therewith. The reflective layer is formed of an alloy of at least two metal elements. The reflective layer contains 0 to 10% by weight of Mr in total, provided that Mc is the center metal where the recording layer contains one metal complex or a metal element having the least ionization tendency among the center metals where the recording layer contains more than one metal complex, and Mr is a metal element or elements equal to or greater than Mc in the ionization tendency. If the total content of Mr exceeds 10% by weight, potential reaction between Mc and Mr detracts from the properties of the recording layer.

In one embodiment, the reflective layer is free of Mr. In another embodiment, the reflective layer contains up to 10% by weight of Mr. In the latter case, the lower limit of the total content of Mr is usually about 1% by weight or up though it varies with the reason for which a particular alloy composition is selected.

In one embodiment, the recording layer contains only one metal complex. In another embodiment, the recording layer contains more than one metal complex. In the latter case, among two or more center metal elements in the recording layer, Mc is a metal element having the least ionization tendency. The proportion of Mc to the remaining center metal element(s) is not critical. In order to prevent deterioration of the dye in the recording layer, the composition of the reflective layer should preferably be selected such that the metal element(s) in the reflective layer other than Mr has less ionization tendency than the center metal element(s) in the recording layer other than Mc.

The reflective layer may be formed of an alloy of at least three metal elements. Where the reflective layer contains Mr, it may contain either two or more metal elements other than Mr or two or more metal elements as Mr insofar as the content of Mr or Mr's is up to 10% by weight.

A combination of a metal in the recording layer with a composition of the reflective layer may be suitably selected for a particular purpose. For example, the center metal element of the metal complex may be at least one element selected from the group consisting of Cu, Ni, Co, Pd, Pt, Mn, Li, Na, Fe, Al, Zn, Ti, V, Cr, and Zr. The metal elements for forming the reflective layer may be selected from the group consisting of Zn, Sn, Ag, Cu, Ti, V, Ta, Cr, Mo, W, Mn, Fe, Co, Rh, Ni, Pd, Pt, Au, and Al such that the content of Mr in the reflective layer may meet the above requirement. More specifically, as previously described, for a recording layer containing a copper complex, the reflective layer may be formed of a silver-copper alloy wherein Mc=Mr=copper (Cu). For a recording layer containing a nickel complex, the reflective layer may be formed of a copper-aluminum alloy wherein Mc is nickel (Ni) and Mr is aluminum (Al). These are preferred combinations although other combinations are possible and effective.

The reflective layer can be formed by any desired physical or chemical vapor deposition method, for example, sputtering.

The reflective layer preferably has a thickness of at least about 600 Å, below which the reflective layer would be low in strength. No upper limit need be imposed on the reflective layer thickness although a thickness in excess of 2,000 Å is superfluous.

The reflective layer alone has a reflectivity of at least 90%, and the reflectivity of an unrecorded portion of an optical recording disk through the substrate can be at least 60%, especially at least 70%.

The organic protective coating 5 is formed on the reflective layer 4. The protective coating is preferably formed by spin coating in order to avoid any damage to the reflective layer while other coating methods including screen printing, dipping and spray coating may be used. The conditions under which the protective coating is formed may be determined by taking into account the viscosity of a coating composition, the desired coating thickness, and other factors without undue experimentation.

The organic protective coating is preferably about 1 to 20 μm thick. Thinner coatings would provide less protection against corrosion of the reflective and recording layers whereas thicker coatings tend to crack due to curing shrinkage or cause disk warpage. If desired, the protective coatings may be of a multilayer structure.

The organic protective coating is preferably formed from a radiation-curable resin. More particularly, it is formed by coating a radiation-curable compound or a polymerizable composition thereof and curing the coating with radiation. The radiation-curable compounds used herein include monomers, oligomers, and polymers having incorporated in their molecule a group capable of crosslinking or polymerization upon exposure to radiation, for example, an acrylic double bond as given by acrylic acid, methacrylic acid and their esters which are sensitive to ionization energy and capable of radical polymerization, an allyl double bond as given by diallyl phthalate, and an unsaturated double bond as given by maleic acid and maleic derivatives. They are preferably polyfunctional, especially at least trifunctional and may be used alone or in admixture of two or more.

The radiation-curable monomers are usually compounds having a molecular weight of lower than 2,000 and the oligomers are those having a molecular weight of 2,000 to 10,000. Examples include acryl-containing monomers and oligomers such as styrene, ethylacrylate, ethylene glycol diacrylate, ethylene glycol dimethacrylate, diethylene glycol diacrylate, diethylene glycol methacrylate, 1,6-hexaneglycol diacrylate, 1,6-hexaneglycol dimethacrylate, and more preferably pentaerythritol tetraacrylate (and methacrylate), pentaerythritol triacrylate (and methacrylate), trimethylolpropane triacrylate (and methacrylate), trimethylolpropane diacrylate (and methacrylate), acryl modified products of urethane elastomers, and derivatives thereof having a functional group such as COOH incorporated therein, acrylates and methacrylates of phenol ethylene oxide adducts, and compounds having a pentaerythritol fused ring having an acryl or methacryl group or ε-caprolactone-acryl group attached thereto as disclosed in Japanese Patent Application No. 72888/1987, and special acrylates as disclosed in Japanese Patent Application No. 72888/1987. Other radiation-curable oligomers include oligoester acrylates, acryl modified urethane elastomers and their derivatives having a functional group such as COOH incorporated therein.

In addition to or instead of the above-mentioned compounds, radiation-curable compounds obtained by modifying thermoplastic resins so as to be radiation sensitive may be used. Examples of such radiation-curable resins include thermoplastic resins having incorporated in their molecule a group capable of crosslinking or polymerization upon exposure to radiation, for example, an acrylic double bond as given by acrylic acid, methacrylic acid and their esters having a radically polymerizable unsaturated double bond, an allyl double bond as given by diallyl phthalate, and an unsaturated bond as given by maleic acid and maleic derivatives. Examples of the thermoplastic resins which can be modified to be radiation curable include vinyl chloride copolymers, saturated polyester resins, polyvinyl alcohol resins, epoxy resins, phenoxy resins, and cellulosic derivatives. Other resins which can be modified to be radiation curable include polyfunctional polyesters, polyether ester resins, polyvinyl pyrrolidone resins and derivatives thereof (e.g., PVP olefin copolymers), polyamide resins, polyimide resins, phenolic resins, spiroacetal resins, and acrylic resins containing at least one acryl ester and methacryl ester containing a hydroxyl group as a polymerizing component.

The radiation to which the coating is exposed may be ultraviolet (UV) radiation, electron radiation, or the like, with UV being preferred. For UV curing, photopolymerization initiators or sensitizers are generally added to the radiation-curable compounds. Any desired photo-polymerization initiator or sensitizer may be used, for example, acetophenones, benzoins, benzophenones, and thioxanthones. A mixture of photo-polymerization initiators may be used. The polymerizable composition generally contains about 0.5 to 5% by weight of photo-polymerization initiator. Such a polymerizable composition may be synthesized by conventional methods or prepared by mixing commercially available compounds.

Another preferred composition containing a radiation-curable compound of which the organic protective coating is formed is a composition containing an epoxy resin and a cationic photo-polymerization catalyst. The epoxy resins used herein are preferably alicyclic epoxy resins, especially those having at least two epoxy groups in a molecule. Examples of the alicyclic epoxy resin include 3,4-epoxycyclohexylmethyl-3,4-epoxycyclohexanecarboxylate, bis(3,4-epoxycyclohexylmethyl) adipate, bis(3,4-epoxycyclohexyl) adipate, 2-(3,4-epoxycyclohexyl-5,5-spiro-3,4-epoxy)cyclohexane-metadioxane, bis(2,3-epoxycyclopentyl) ether, and vinylcyclohexene dioxide. The alicyclic epoxy resin preferably has an epoxy equivalent of 60 to 300, especially 100 to 200 for better curing though not limited thereto.

Well-known cationic photo-polymerization catalysts may be used. Examples include metal fluoroborate salts, boron trifluoride complexes, bis(perfluoroalkyl sulfonyl)methane metal salts, aryldiazonium compounds, aromatic onium salts of Group 6A elements, aromatic onium salts of Group 5A elements, dicarbonyl chelates of Group 3A to 5A elements, thiopyrilium salts, Group 6A elements having a $MF_6$ anion wherein M is P, As or Sb, triarylsulfonium complex salts, aromatic iodonium complex salts, and aromatic sulfonium complex salts, with the polyarylsulfonium complex salts, aromatic sulfonium and iodonium complex salts of halogen-containing complex ions, and aromatic onium salts of Group 3A, 5A and 6A elements being preferred.

Also useful are cationic photo-polymerization catalysts containing an organometallic compound and a photo-decomposable organic silicon compound. These cationic photo-polymerization catalysts are non-strong acid systems and avoid any detrimental influence to the sensitive recording layer of the optical recording disk. The organometallic compounds include complex compounds having alkoxy, phenoxy, $\beta$-diketonato and other groups coordinated to a metal atom such as Ti, V, Cr, Mn, Fe, Co, Ni, Cu, Zn, Al and Zr. Preferred among these are organic aluminum compounds, for example, trismethoxy aluminum, trispropionato aluminum, tristrifluoroacetyl aluminum, and trisethylacetoacetonato aluminum. The photo-decomposable organic silicon compounds yield silanol upon exposure to light such as ultraviolet radiation and include silicon compounds having a peroxysilano, o-nitrobenzyl or $\alpha$-ketosilyl group.

Preferably the composition contains about 0.05 to 0.7 parts, especially about 0.1 to 0.5 parts by weight of the cationic photo-polymerization catalyst per 100 parts by weight of the epoxy resin.

More preferably, a composition containing an acryl-containing compound as a radiation curable compound and a photo-polymerization initiator or sensitizer is coated and cured with radiation, typically UV radiation.

In forming a protective coating, a coating of a polymerizable composition as defined above is exposed to UV radiation, or heated and then exposed to UV radiation if desired. Electron radiation may be used instead of UV radiation. Typically, coatings are exposed to UV radiation at an intensity of at least about 50 mW/cm$^2$ and a dose of about 500 to 2,000 mJ/cm$^2$. The UV radiation source may be any of conventional ones such as mercury lamps. On UV exposure, the compounds undergo radical polymerization.

Various pigment particles may be contained in the protective coating, if desired.

On the organic protective coating 5, there may be formed a labeling layer in the form of at least one printed layer. The labeling layer is preferably formed by printing a radiation-curable resin composition containing a pigment and curing it. Alternatively, a thermosetting ink composition may be used.

Operation

Recording or additional recording may be carried out on the optical recording disk 1 of the above-described construction by directing recording light having a wavelength of 780 nm, for example, in pulse form to the recording layer 3 in the groove 21 through the substrate 2 to form an irradiated or recorded spot whose optical reflectivity has changed. The recording layer 3 absorbs light so that it is heated while the substrate 2 is heated at the same time. As a result, the recording material, typically dye melts or decomposes near the interface between the substrate 2 and the recording layer 3, probably applying a pressure to the interface to deform the bottom and side walls of the groove 21.

EXAMPLE

Examples of the present invention are given below by way of illustration and not by way of limitation.

Example 1

An optical recording disk sample as shown in FIG. 1 was prepared by starting with a polycarbonate resin substrate having a continuous spiral groove and a diameter of 120 mm and a thickness of 1.2 mm. A recording layer 3 containing a dye was formed on the substrate 2 by spin coating. Then a reflective layer 4 and a protective coating 5 were formed on the recording layer.

The coating solution used in forming the recording layer contained a dye and an organic solvent. The dye was a mixture of 60% by weight of dye A1, 30% by weight of dye A2, and 10% by weight of singlet oxygen quencher Q1 (copper complex) or Q2 (nickel complex), all defined below.

A1

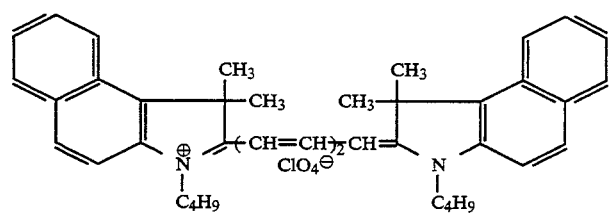

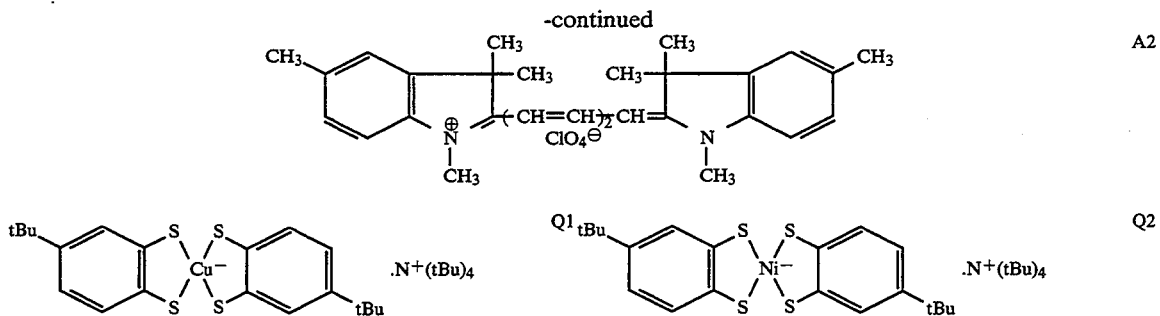

The organic solvent used was diacetone alcohol. The coating solution contained 5% by weight of the dye. The recording layer was 200 nm thick.

The reflective layer was formed from Ag—Cu or Cu—Al alloy to a thickness of 85 nm by sputtering. The composition of the reflective layer is shown in Table 1.

The protective coating was formed by spin coating a UV-curable resin available as SD-17 from Dai-Nippon Ink K.K. and curing it with UV radiation. It was 5 μm thick at the end of curing.

Using a commercially available CD player for reading, the disk samples were measured for block error rate (BLER) both at the initial and after 100 hour storage in a 80° C./RH 80% environment. BLER was counted for 10 minutes and an average value per second was calculated. The CD standard prescribes a BLER of up to 220 counts/sec.

The results are shown in Table 1.

TABLE 1

| Sample No. | Recording layer | Reflective layer composition (wt %) | BLER Initial | BLER 80° C./RH 80%/100 hr. |
|---|---|---|---|---|
| 1 | Cu complex | Ag—Cu (95–5) | 1.0 | 2.0 |
| 2* | Cu complex | Ag—Cu (50–50) | 1.0 | 400 |
| 3 | Ni complex | Cu—Al (95–5) | 0.5 | 7.0 |
| 4* | Ni complex | Cu—Al (60–40) | 0.8 | 250 |

*comparison

The effectiveness of the invention is evident from Table 1.

We claim:

1. An optical recording disk, comprising:
 a substrate,
 a dye base recording layer on the substrate, and
 a reflective layer on the recording layer,
 said recording layer contains at least one copper complex having copper as a center metal,
 said reflective layer is formed of a silver-copper alloy having 1 to 10 by total percentage weight of copper.

2. The optical recording disk of claim 1 wherein the metal complex contained in said recording layer is a dye or a quencher or a mixture of a dye and a quencher.

* * * * *

UNITED STATES PATENT AND TRADEMARK OFFICE
CERTIFICATE OF CORRECTION

PATENT NO. : 5,391,462
DATED : 21 February 95
INVENTOR(S) : Hiroyuki ARIOKA ET AL.

It is certified that error appears in the above-identified patent and that said Letters Patent is hereby corrected as shown below:

On the title page, item [54] and in column 1, line 2, the title should read as follows:

--[54] OPTICAL RECORDING DISK --.

Signed and Sealed this

Thirtieth Day of May, 1995

Attest:

BRUCE LEHMAN

Attesting Officer     Commissioner of Patents and Trademarks